(12) United States Patent
Goodhue et al.

(10) Patent No.: US 7,290,119 B2
(45) Date of Patent: Oct. 30, 2007

(54) MEMORY ACCELERATOR WITH TWO INSTRUCTION SET FETCH PATH TO PREFETCH SECOND SET WHILE EXECUTING FIRST SET OF NUMBER OF INSTRUCTIONS IN ACCESS DELAY TO INSTRUCTION CYCLE RATIO

(75) Inventors: Gregory K. Goodhue, San Jose, CA (US); Ata R. Khan, Saratoga, CA (US); John H. Wharton, Palo Alto, CA (US); Robert Michael Kallal, Longmont, CO (US)

(73) Assignee: NXP B.V., Eindhoven (NL)

( * ) Notice: Subject to any disclaimer, the term of this patent is extended or adjusted under 35 U.S.C. 154(b) by 400 days.

(21) Appl. No.: 10/923,284

(22) Filed: Aug. 20, 2004

(65) Prior Publication Data

US 2005/0021928 A1    Jan. 27, 2005

Related U.S. Application Data

(63) Continuation of application No. 09/788,691, filed on Feb. 20, 2001, now Pat. No. 6,799,264.

(51) Int. Cl.
*G06F 9/28* (2006.01)

(52) U.S. Cl. .................. 712/205; 711/167; 712/207

(58) Field of Classification Search .............. None
See application file for complete search history.

(56) References Cited

U.S. PATENT DOCUMENTS

| | | | | |
|---|---|---|---|---|
| 4,438,493 A | * | 3/1984 | Cushing et al. | 711/218 |
| 4,755,933 A | * | 7/1988 | Teshima et al. | 711/157 |
| 5,634,025 A | * | 5/1997 | Breternitz, Jr. | 712/207 |
| 5,659,713 A | | 8/1997 | Goodwin et al. | 711/157 |
| 6,643,755 B2 | | 11/2003 | Goodhue et al. | 711/173 |

FOREIGN PATENT DOCUMENTS

EP    0180236    5/1986

* cited by examiner

*Primary Examiner*—Kenneth S. Kim
(74) *Attorney, Agent, or Firm*—Peter Zawilski

(57) ABSTRACT

A memory accelerator module buffers program instructions and/or data for high speed access using a deterministic access protocol. The program memory is logically partitioned into 'stripes', or 'cyclically sequential' partitions, and the memory accelerator module includes a latch that is associated with each partition. When a particular partition is accessed, it is loaded into its corresponding latch, and the instructions in the next sequential partition are automatically pre-fetched into their corresponding latch. In this manner, the performance of a sequential-access process will have a known response, because the pre-fetched instructions from the next partition will be in the latch when the program sequences to these instructions. Previously accessed blocks remain in their corresponding latches until the pre-fetch process 'cycles around' and overwrites the contents of each sequentially-accessed latch. In this manner, the performance of a loop process, with regard to memory access, will be determined based solely on the size of the loop. If the loop is below a given size, it will be executable without overwriting existing latches, and therefore will not incur memory access delays as it repeatedly executes instructions contained within the latches. If the loop is above a given size, it will overwrite existing latches containing portions of the loop, and therefore require subsequent re-loadings of the latch with each loop. Because the pre-fetch is automatic, and determined solely on the currently accessed instruction, the complexity and overhead associated with this memory acceleration is minimal.

5 Claims, 1 Drawing Sheet

MEMORY ACCELERATOR WITH TWO INSTRUCTION SET FETCH PATH TO PREFETCH SECOND SET WHILE EXECUTING FIRST SET OF NUMBER OF INSTRUCTIONS IN ACCESS DELAY TO INSTRUCTION CYCLE RATIO

This is a Continuation of application Ser. No. 09/788,691, filed Feb. 20, 2001 now U.S. Pat. No. 6,799,264.

CROSS-REFERENCE TO RELATED APPLICATIONS

This application is related to concurrently filed U.S. patent application "CYCLICALLY SEQUENTIAL MEMORY PREFETCH", Ser. No. 09/788,692 now issued a U.S. Pat. No. 6,643,755.

BACKGROUND OF THE INVENTION

1. Field of the Invention

This invention relates to the field of electronic processing devices, and in particular to a processing system that uses the Advanced RISC Machine (ARM) architecture and flash memory.

2. Description of Related Art

The Advanced RISC Machine (ARM) architecture is commonly used for special purpose applications and devices, such as embedded processors for consumer products, communications equipment, computer peripherals, video processors, and the like. Such devices are typically programmed by the manufacturer to accomplish their intended function. The program or programs are generally loaded into "read-only" memory (ROM), which may be permanent (masked-ROM), or non-volatile (EPROM, EEPROM, Flash), which may be co-located or external to the ARM processor. The read-only memory typically contains the instructions required to perform the intended functions, as well as data and parameters that remain constant; other, read-write memory (RAM) is also typically provided, for the storage of transient data and parameters. In the ARM architecture, the memory and external devices are accessed via a high-speed bus.

To allow the manufacturer to correct defects in the program, or to provide new features or functions to existing devices, or to allow the updating of the 'constant' data or parameters, the read-only memory is often configured to be re-programmable. "Flash" memory is a common choice for re-programmable read-only memory. The contents of the flash memory are permanent and unchangeable, except when a particular set of signals is applied. When the appropriate set of signals is applied, revisions to the program may be downloaded, or revisions to the data or parameters may be made, for example, to save a set of user preferences or other relatively permanent data.

The time required to access programs or data in a flash memory, however, is generally substantially longer than the time required to access other storage devices, such as registers or latches. If the processor executes program instructions directly from the flash memory, the access time will limit the speed achievable by the processor. Alternatively, the flash memory can be configured primarily as a permanent storage means that provides data and program instructions to an alternative, higher speed, memory when the device is initialized. Thereafter, the processor executes the instructions from the higher speed memory. This redundant approach, however, requires that a relatively large amount of higher speed memory be allocated to program storage, thereby reducing the amount of higher speed memory being available for storing and processing data.

To reduce the amount of redundant high speed memory required for executing the program instructions, while still providing the benefits of higher speed memory, cache techniques are commonly used to selectively place portions of the program instructions into the higher speed memory. In a conventional cache system, the program memory is partitioned into blocks, or segments. When the processor first accesses an instruction in a particular block, that block is loaded into the higher speed cache memory. During the transfer of the block of instructions from the lower speed memory to cache, the processor must wait. Thereafter, instructions in the loaded block are executed from cache, thereby avoiding the delay associated with accessing the instructions from the slower speed memory. When an instruction in another block is accessed, this other block is loaded into cache, while the processor waits, and then the instructions from this block are executed from cache. Typically, the cache is configured to allow the storage of multiple blocks, to prevent "thrashing", wherein a block is continually placed into cache, then overwritten by another block, then placed back into cache. A variety of schemes are available for optimizing the performance of cache systems. The frequency of access to a block is conventionally used as criteria for determining which blocks of cache are replaced when a new block is to be loaded into cache. Additionally, look-ahead techniques can be applied to predict which block, or blocks, of memory will be accessed next, and pre-fetching the appropriate blocks into cache, to have the instructions in cache when required.

Conventional cache management systems are relatively complex, particularly if predictive techniques are employed, and require a substantial overhead for maintaining, for example, the access frequency of each block, and other cache prioritizing parameters. Also, the performance of a cache system for a particular program is difficult to predict, and program bugs caused by timing problems are difficult to isolate. One of the major causes of the unpredictability of cache performance is the 'boundary' problem. The cache must be configured to allow at least two blocks of memory to be in cache simultaneously, to avoid thrashing when a program loop extends across a boundary between blocks. If a change is made such that the loop no longer extends across the boundary, cache will be available to contain other blocks, and thus the performance will be different in each case. Such a change, however, may be a side-effect of a completely unrelated change that merely changed in size, and thereby moved the loop's location in memory. Similarly, the number of times a loop is executed may be a function of the parameters of a particular function. As such, the aforementioned access frequency parameter associated with each block may differ with different user conditions, thereby resulting in a different allocation of cache for each running of the same program.

Because ARM-based microcontrollers are commonly used for high performance applications, or time critical applications, timing predictability is often an essential characteristic, which often renders a cache-based memory access scheme infeasible. Additionally, cache storage typically consumes a significant amount of circuit area, and a significant amount of power, rendering its use impractical for low-cost or low-power applications, where microcontrollers are commonly used.

BRIEF SUMMARY OF THE INVENTION

It is an object of this invention to provide a microcontroller memory architecture that provides an efficient memory access process. It is a further object of this invention to provide a microcontroller memory architecture that provides an efficient memory access process with a minimal amount of overhead and complexity. It is a further object of this invention to provide a microcontroller memory architecture that provides an efficient memory access process with highly predictable performance.

These objects and others are achieved by providing a memory accelerator module that buffers program instructions and/or data for high speed access using a deterministic access protocol. The program memory is logically partitioned into 'stripes', or 'cyclically sequential' partitions, and the memory accelerator module includes a latch that is associated with each partition. When a particular partition is accessed, it is loaded into its corresponding latch, and the instructions in the next sequential partition are automatically pre-fetched into their corresponding latch. In this manner, the performance of a sequential-access process will have a known response, because the pre-fetched instructions from the next partition will be in the latch when the program sequences to these instructions. Previously accessed blocks remain in their corresponding latches until the pre-fetch process 'cycles around' and overwrites the contents of each sequentially-accessed latch. In this manner, the performance of a loop process, with regard to memory access, will be determined based solely on the size of the loop. If the loop is below a given size, it will be executable without overwriting existing latches, and therefore will not incur memory access delays as it repeatedly executes instructions contained within the latches. If the loop is above a given size, it will overwrite existing latches containing portions of the loop, and therefore require subsequent re-loadings of the latch with each loop. Because the pre-fetch is automatic, and determined solely on the currently accessed instruction, the complexity and overhead associated with this memory acceleration is minimal.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
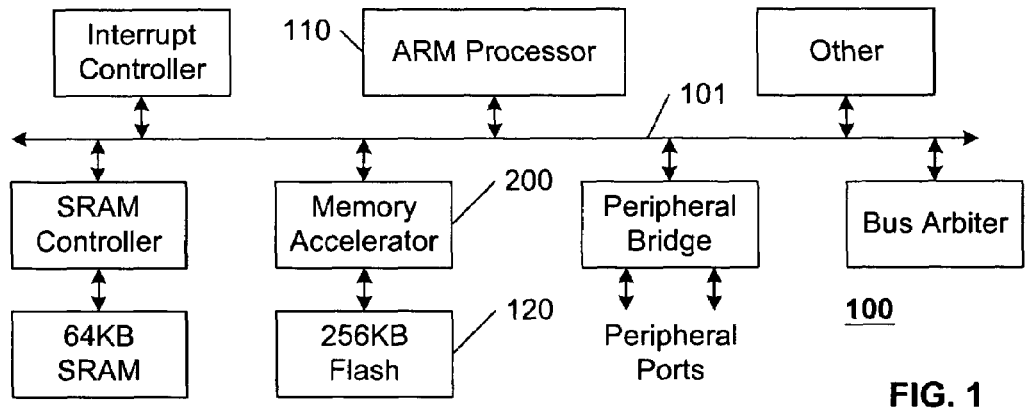
FIG. 1 illustrates an example block diagram of a microcontroller having a memory accelerator in accordance with this invention.

FIG. 1 illustrates an example block diagram of a microcontroller 100, comprising a processor 110 that is configured to execute program instructions and/or access data that are located in a flash memory 120. For ease of reference and understanding, this invention is presented using the paradigm of an ARM processor 110 that communicates with the memory 120 and other components via a high performance bus 101. Also for ease of reference, the paradigm of loading program instructions is used to illustrate the principles of the invention. As will be evident to one of ordinary skill in the art, the principles presented in this disclosure are applicable to other computer memory architectures and structures as well; and, the principles presented are equally applicable to the loading of either program instruction or data from memory. The term data item is used herein to refer to either a program instruction or datum.

In accordance with this invention, a memory accelerator 200 is located between the bus 101 and the memory 120, and is configured to isolate the performance of the processor 110 from the performance of the memory 120. The accelerator 200 contains memory elements that have a substantially faster access time than the memory 120. Preferably, the memory access time for retrieving instructions from the accelerator 200 is less than the time required for the processor 110 to execute the instruction, so that the memory access time does not affect the performance of the processor 110. The memory accelerator 200 is configured to store recently accessed instructions, so that repeated accesses to the same instructions, for example, instructions in a loop structure, can be retrieved from the accelerator 200, without requiring subsequent accesses to the memory 120. Additionally, the memory accelerator 200 is configured to have multiple parallel access paths to the memory 120, and this parallelism allows the accelerator 200 to buffer the slower access to the memory 120 during accesses to sequential instructions in the memory 120.

Figure 2:
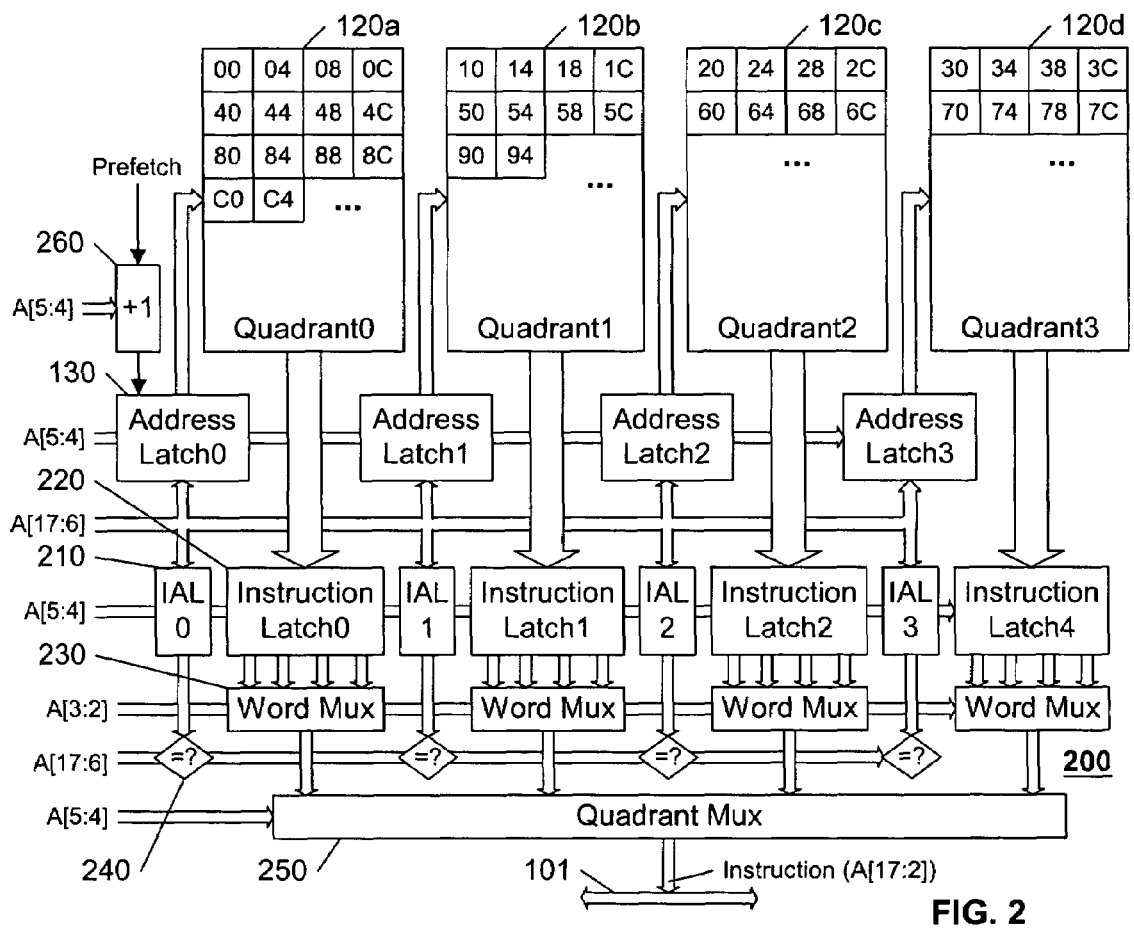
FIG. 2 illustrates an example block diagram of a memory accelerator and memory structure in accordance with this invention.

U.S. patent application, "CYCLICALLY SEQUENTIAL MEMORY PREFETCH", Ser. No. 09/788,692, filed Feb. 20, 2001 for Gregory K. Goodhue, Ata R. Khan, and John H. Wharton, now issued as U.S. Pat. No. 6,643,755, presents a memory access scheme that allows for efficient memory access with minimal complexity and overhead, and is incorporated by reference herein. FIG. 2 illustrates an example embodiment of the memory accelerator 200 and a corresponding logical structuring of the memory 120 that is based on the principles presented in this cited application.

As illustrated in FIG. 2, the memory 120 is logically partitioned into four quadrants 120a-120d. These quadrants form "stripes" or "cyclically sequential" partitions of the address space of the memory 120 (of FIG. 1). In this example, each instruction is assumed to be a 32-bit word, organized as four 8-bit bytes. Example byte-addressed sequential instructions (00, 04, . . . ) are illustrated within each partition 120a-120d, using hexidecimal notation. As illustrated, each quadrant contains "lines" of four sequential words (sixteen bytes, or 128 bits), and the addresses in each quadrant sequentially follow each other. That is, for example, partition 120a contains words at addresses 00, 04, 08, and 0C; the next set of four words, at addresses 10, 14, 18, and 1C, are in the next partition 120b. The last partition contains words at addresses 30, 34, 38, and 3C, and the next set of four words, at addresses 40, 44, 48, and 4C are located in the first quadrant 120a. The term "segment" is used hereinafter in lieu of "line", to indicate a single set of continuous memory locations from the first memory location of the first partition to the last memory location of the last partition. That is, for example, the first segment corresponds to addresses 00 through 3F; the next segment corresponds to word addresses 40 through 7F; and so on.

The number of partitions, and the number of words per partition, is determined based on the relative speed of the processor 110 (of FIG. 1) and the access speed of the memory 120, such that the time to load N instructions from a partition of the memory is less than the time required to execute the N instructions. Preferably, the number of partitions and the number of words per partition are each a power of two, so that each partition and each instruction can be accessed based on a subset of the bits forming the address of the instructions in the memory 120. For ease of reference and understanding, the example four-quadrant, four-words-per-partitioning structure of FIG. 2 is discussed hereinafter, without implying a limit to the intended scope of this invention to this partitioning.

An instruction latch 220 is associated with each of the quadrants 120a-d. When the processor requests access to an instruction at a particular memory address, the set of four words containing that address is retrieved from the appropriate quadrant 120a-d and stored in the corresponding instruction latch 220. The requested instruction is subsequently provided to the processor 110, via the bus 101 (of FIG. 1) from the latch 220. If the latch 220 already contains the requested instruction, from a prior load of the instruction from the memory 120, the instruction can be provided directly to the processor 110 from the latch 220, and an access to the memory 120 can be avoided.

An address latch 130 is provided with each quadrant 120a-d, to store the address from the bus 101 corresponding to the requested instruction address, to allow pipelined address generation on the bus. In the example of a four-quadrant partitioning, with each quadrant containing four words, or sixteen bytes, the lower four bits of the address, A[3:0], correspond to the sixteen bytes; the next upper two bits of the address, A[5:4], correspond to the particular quadrant; and the remaining upper bits, A[M:6], where M is the size of the address, correspond to the particular segment of four sets of four words each. In the ARM example, the size of the address is 18-bits wide, and the segment address corresponds to A[17:6]. This is the address that is stored in the address latch 130 of the addressed quadrant 120a-d. The quadrant address A[5:4] is used to enable the latch corresponding to the addressed quadrant. When the addressed set of four words, A[17:4], is loaded into the corresponding address latch 130, the segment address, A[17:6] is loaded into an Instruction Address Latch (IAL) 210 that corresponds to the address latch 130. The quadrant address A[5:4] enables the appropriate instruction latch 220 and instruction address latch 210 to receive the instruction and segment address, respectively.

When an instruction at an address A[17:2] is requested by the processor 110, the contents of the corresponding IAL 210 (as addressed by A[5:4]) is compared to the requested segment address A[17:6], as illustrated by the diamond shaped decision block 240 in FIG. 2. If the stored segment address in the IAL 210 corresponds to the requested segment address, the contents of the corresponding instruction latch 220 is provided to the word multiplexer 230. The lower order bits of the instruction address, A[3:2], are used to select the particular instruction within the set of four words that are stored in the instruction latch 220. The output of the addressed word multiplexer 230 is selected via the quadrant multiplexer 250, and placed on the bus 101. Other multiplexing and selection schemes will be evident to one of ordinary skill in the art. If the stored segment address in the IAL 210 does not correspond to the requested segment address, the requested segment is first loaded into the instruction latch 220 from the memory 120, and the loaded segment's address is loaded into the IAL 210, and the contents of the latch 220 is selected for placement on the bus 101 as detailed above.

In accordance with this invention, when an instruction in one quadrant (120a,b,c,d) is accessed, the instructions in the next cyclically-sequential quadrant (120b, c, d, a) are automatically loaded, or pre-fetched, into the corresponding latch 220, in anticipation of a subsequent access to these instructions. As discussed above, the number of words, N, per quadrant for each segment is preferably chosen such that the execution of N instructions by the processor 110 consumes more time than the pre-fetching of the next quadrant's instructions from the memory 120, so that the appropriate instructions are contained in the next cyclically-sequential instruction latch 220 when the processor 110 progresses sequentially to these instructions. In this manner, continuous sequential portions of a program will be executed without incurring memory access delays, other than the initial delay to access the first set of N instructions. Alternatively viewed, slower, and less expensive, memory 120 can be employed in a system by increasing the width, N, of the quadrants.

As illustrated in FIG. 2, a pre-fetch incrementer 260 is provided to facilitate the prefetch of instructions from the first quadrant 120a when the last quadrant 120d is the addressed quadrant, thereby effecting the cyclically-sequential access to the "next" quadrant when the last quadrant is accessed. For accesses to other than the last quadrant, the segment number of the instructions in the next quadrant is the same as the currently addressed segment. If the next quadrant's instruction latch 220 already contains the next set of instructions relative to the addressed instruction, from a prior access to the addressed quadrant and segment, the above pre-fetch process is avoided.

In a typical flow of sequential instructions and short loops, the "steady state" condition of the set of instruction latches 220 will be such that one latch contains the currently accessed instruction, and at least one latch contains the contents of the next sequential set of instructions, and the remaining latches will contain instructions prior to the currently accessed instruction. In the example embodiment of FIG. 2, wherein the latches 220 are configured to contain up to sixteen instructions, if a program loop comprises no more than nine instructions, it will be guaranteed to be contained in the set of instruction latches 220 after its first iteration, regardless of the location of the loop relative to the boundaries of the quadrants. Similarly, if the loop contains more than twelve instructions, it is guaranteed not to be contained in the set of instructions 220, because at least four instructions after the end of the loop will be loaded in the latches 220 when the end of the loop is executed during the first iteration. If the loop contains ten to twelve instructions, it may or may not be totally contained in the latches 220, based upon the location of the loop relative to the boundaries between quadrants. Thus, except for loops of ten to twelve instructions, the time required to execute the loop, based on memory access time, can be determined without regard to the actual location of the loop in the memory 120. For loops of ten to twelve instructions, the time required to execute the loop will also be determinable, but only after the program is allocated to specific memory locations. Alternatively viewed, the number of partitions of memory, or the number of instructions, N, per partition width can be adjusted so as to provide effective performance for particular anticipated loop sizes.

Because the performance of each loop, other than those of ten to twelve instructions in length, is solely dependent upon the size of the loop, the user can purposely structure critical loops to be nine instructions or fewer. Similarly, if the loop cannot be effected within twelve instructions, the user can purposely determine whether the loop will satisfy its time constraints, with the knowledge that memory access delays will definitely be incurred within the loop. The performance of loops of ten to twelve instructions can similarly be determined, albeit after the loop is allocated to memory, or to virtual blocks of memory having a known correspondence to the boundaries of the memory quadrants 120a-d. It is significant to note that the maximum number of memory access delays per loop, regardless of size, is one. For loops less of less than nine instructions, and some loops of size ten to twelve instructions, the number of access delays per loop is zero, for all other loops, the number of access delays per loop is one. Thus, the worst case performance occurs for loops of thirteen instructions; as the size of the loop increases, the automatic sequential prefetch continually eliminates memory access delays, thereby improving the overall memory access efficiency, compared to a loop of thirteen instructions.

In accordance with another aspect of this invention, the degree of acceleration provided by the memory accelerator 200 can be controlled, thereby increasing the deterministic nature of the program as required. In this embodiment, the latches 220 are selectively configurable to effect all, or some, or none, of the aforementioned memory access optimizations. The automatic prefetch is independently controllable, as is the checking to determine whether the requested instruction is already contained in the latch 220. An additional access mode also forces a read from the memory 120 whenever a non-sequential sequence of program instructions is encountered. That is, in this alternative access mode, the execution of a branch instruction necessarily invokes a memory access delay. Each of these options is provided to allow a tradeoff between determinism and performance, and will be dependent upon the balance between determinism and performance that is selected by the user. In a preferred embodiment, an application program is provided that converts user selections into the appropriate configuration settings or commands.

The foregoing merely illustrates the principles of the invention. It will thus be appreciated that those skilled in the art will be able to devise various arrangements which, although not explicitly described or shown herein, embody the principles of the invention and are thus within its spirit and scope. For example, a parallel set of latches 210 and 220 can be configured to provide accelerated memory access for data that is contained in the memory 120. Access to the data is preferably segregated from the access to program instructions, to prevent thrashing when an instruction in the memory 120 contains a reference to a data item that is also in the memory 120. In lieu of providing four sets of data-address and data latches, and in lieu of automatically prefetching data from the next sequential series of data, one data-address and data latch can be provided, to merely buffer the currently accessed quadrant. This reduces the resources required to buffer accesses to data items, but does not provide the data access delay reductions that could be achieved when data in the memory is accessed substantially consecutively, or repeatedly. In like manner, a parallel set of latches 210 and 220 may also be provided for accessing a different class, or type, of memory. For example, if the system comprises both internal and external memory, an independent set of latches may be provided for each, each set of latches being configured based on the performance and capabilities of the particular type of memory being accelerated, such as via the use of wider registers for slower memory, and so on. These and other system configuration and optimization features will be evident to one of ordinary skill in the art in view of this disclosure, and are included within the scope of the following claims.

The invention claimed is:

1. A computer system comprising;
   a processor that is configured to execute program instructions that are contained in a memory; and
   a memory access system that includes:
   a plurality of instruction latches, each instruction latch of the plurality of instruction latches being associated with a corresponding partition of a plurality of cyclically sequential partitions of the memory; wherein
   the memory access system is configured to cotemporaneously;
   determine whether an instruction addressed by the processor is contained in a first instruction latch of the plurality of instruction latches, based on an identification of the partition of the memory corresponding to the addressed instruction,
   load a first plurality of instructions, including the addressed instruction, from the memory and into the first instruction latch, if the addressed instruction is not in the first instruction latch, and
   load a second plurality of instructions from the memory and into a second instruction latch of the plurality of instruction latches, if the second plurality of instructions is not in the second instruction latch,
   so that the first and second plurality of instructions are available for direct access by the processor from the corresponding first and second instruction latches;
   wherein
   each of the plurality of first and second instruction latches include a number of instruction latches that is based on a ratio of an access delay of the memory and an instruction cycle time of the processor,
   so that the load of the second plurality of instructions is effected within a time required to execute the first plurality of instructions.

2. A microcontroller comprising:
   a memory that is configured to store program instructions,
   a processor that is configured to execute the program instructions that are stored in the memory, and
   a memory accelerator, operably coupled between the processor and the memory, that is configured to receive select program instructions from the memory and to provide an addressed instruction of the select program instructions to the processor; wherein
   the memory and the memory accelerator are operably coupled to each other via a plurality of access paths, and
   to receive a first set of instructions from the memory via a first access path of the plurality of access paths, based on an instruction address that is provided by the processor corresponding to the addressed instruction, and
   to receive a second set of instructions from the memory via a second access path of the plurality of access paths, the second set of instructions having addresses that are sequential to addresses of the first set of instructions, and
   to provide the addressed instruction and subsequent instructions to the processor from the first and second set of instructions contained in the memory accelerator; and
   wherein each of the first and second sets of instructions include a number of instructions that is based on a ratio of an access delay associated with the memory and an instruction cycle time of the processor, so that the receipt of the second set of instructions is effected within a time required to execute the first set of instructions.

3. The microcontroller of claim 2, wherein the plurality of access paths comprises four access paths, each access path corresponding to a cyclically sequential quadrant of the memory.

4. The microcontroller of claim 2, wherein the memory accelerator is also configured to allow a selective disabling of the receiving of the second plurality of instructions from the memory.

5. The microcontroller of claim 2, wherein the memory accelerator is further configured to receive a set of data items from the memory via another access path of the plurality of access paths, based on a data address that is provided by the processor, and to provide the addressed data item to the processor from the set of data items contained in the memory accelerator.

\* \* \* \* \*